(12) United States Patent
Bugovics

(10) Patent No.: US 11,538,183 B2
(45) Date of Patent: *Dec. 27, 2022

(54) 3D OBJECT SENSING SYSTEM

(71) Applicant: TWINNER GMBH, Halle (DE)

(72) Inventor: Jozsef Bugovics, Leipzig (DE)

(73) Assignee: Twinner GmbH, Halle (DE)

( * ) Notice: Subject to any disclaimer, the term of this patent is extended or adjusted under 35 U.S.C. 154(b) by 76 days.

This patent is subject to a terminal disclaimer.

(21) Appl. No.: 17/043,292

(22) PCT Filed: Mar. 26, 2019

(86) PCT No.: PCT/DE2019/000091
§ 371 (c)(1),
(2) Date: Sep. 29, 2020

(87) PCT Pub. No.: WO2019/185079
PCT Pub. Date: Oct. 3, 2019

(65) Prior Publication Data
US 2021/0019907 A1   Jan. 21, 2021

(30) Foreign Application Priority Data

Mar. 29, 2018  (DE) .......................... 102018002622.2

(51) Int. Cl.
*G06K 9/00*      (2022.01)
*G06T 7/70*      (2017.01)
(Continued)

(52) U.S. Cl.
CPC ............. *G06T 7/70* (2017.01); *G01B 11/002* (2013.01); *G01B 11/03* (2013.01); *G01B 11/22* (2013.01);
(Continued)

(58) Field of Classification Search
CPC ....... G06T 7/00; G06T 7/0002; G06T 7/0004; G06T 7/0006; G06T 7/0008; G06T 7/001;
(Continued)

(56) References Cited

U.S. PATENT DOCUMENTS 6,611,617 B1 * 8/2003 Crampton .......... G01B 11/2518
382/154
9,258,550 B1 * 2/2016 Sieracki ................. G06V 20/66
(Continued)

FOREIGN PATENT DOCUMENTS

CN      101387493 A       3/2009
CN      101484360 A       7/2009
(Continued)

OTHER PUBLICATIONS

Buckley Simon J et al, "Terrestrial lidar and hyperspectral data fusion products for geological outcrop analysis", Computers and Geosciences, Pergamon Press, Oxford, GB, (Feb. 8, 2013), vol. 54, doi:10.1016/J.CAGEO.2013.01.018, ISSN 0098-3004, pp. 249-258, XP028525895.
(Continued)

*Primary Examiner* — Eric Rush
(74) *Attorney, Agent, or Firm* — Laurence A. Greenberg; Werner H. Stemer; Ralph E. Locher

(57) ABSTRACT

A 3D object sensing system includes an object positioning unit, an object sensing unit, and an evaluation unit. The object positioning unit has a rotatable platform and a platform position sensing unit. The object sensing unit includes two individual sensing systems which each have a sensing area. A positioning unit defines a positional relation of the individual sensing systems to one another. The two individual sensing systems sense object data of object points of the 3D object and provide the object data the evaluation unit. The evaluation unit includes respective evaluation modules
(Continued)

for each of the at least two individual sensing systems, an overall evaluation module and a generation module.

5 Claims, 2 Drawing Sheets

(51) Int. Cl.
| | |
|---|---|
| *G06T 7/00* | (2017.01) |
| *G06T 7/55* | (2017.01) |
| *G01B 11/03* | (2006.01) |
| *G06V 10/10* | (2022.01) |
| *G06T 7/50* | (2017.01) |
| *G01B 11/25* | (2006.01) |
| *G01B 11/00* | (2006.01) |
| *G01S 17/894* | (2020.01) |
| *G01B 11/22* | (2006.01) |
| *G01S 17/86* | (2020.01) |
| *G01S 17/87* | (2020.01) |

(52) U.S. Cl.
CPC .......... *G01B 11/2522* (2013.01); *G01S 17/86* (2020.01); *G01S 17/87* (2013.01); *G01S 17/894* (2020.01); *G06T 7/0002* (2013.01); *G06T 7/50* (2017.01); *G06T 7/55* (2017.01); *G06T 7/97* (2017.01); *G06V 10/16* (2022.01); *G06T 2207/20212* (2013.01); *G06T 2207/20221* (2013.01); *G06T 2207/20224* (2013.01)

(58) Field of Classification Search
CPC .. G06T 7/50; G06T 7/521; G06T 7/55; G06T 7/70; G06T 7/97; G06T 15/00; G06T 15/005; G06T 15/08; G06T 2207/10048; G06T 2207/20212; G06T 2207/20216; G06T 2207/20221; G06T 2207/20224; G06T 2207/20228; G06T 2207/30108; G06T 2207/30144; G06T 2207/30168; G06K 9/6288; G06V 10/10; G06V 10/12; G06V 10/16; G01B 11/002; G01B 11/005; G01B 11/022; G01B 11/026; G01B 11/03; G01B 11/22; G01B 11/24; G01B 11/245; G01B 11/25; G01B 11/2518; G01B 11/2522; G01B 21/18; G01B 21/20; G01B 2210/52; G01S 17/42; G01S 17/46; G01S 17/48; G01S 17/86; G01S 17/87; G01S 17/88; G01S 17/89; G01S 17/894; H04N 13/25; G01N 21/88; G01N 21/8803; G01N 21/8851
USPC ............ 382/100, 103, 106, 112, 141–143, 382/152–154, 224, 274–276, 284, 285, 382/312, 318, 325; 345/419, 428, 581, 345/606, 629–631; 356/3, 12, 237.1, 356/240.1, 601–603, 606–608, 610–612, 356/626; 250/206.1, 206.2, 208.1; 702/81–84, 155, 156, 167
See application file for complete search history.

(56) References Cited

U.S. PATENT DOCUMENTS

| | | | |
|---|---|---|---|
| 2003/0071194 A1* | 4/2003 | Mueller | G06T 7/55 |
| | | | 348/E13.016 |
| 2007/0146728 A1 | 6/2007 | Pristner | |
| 2007/0262983 A1* | 11/2007 | Choi | G06T 15/04 |
| | | | 345/420 |
| 2012/0056982 A1* | 3/2012 | Katz | G06T 7/521 |
| | | | 348/43 |
| 2014/0112573 A1 | 4/2014 | Francis, Jr. et al. | |
| 2017/0011524 A1* | 1/2017 | Shpunt | G06T 7/521 |
| 2017/0227942 A1* | 8/2017 | Thomson | G06T 7/75 |
| 2018/0113083 A1* | 4/2018 | Van Dael | G06T 7/001 |

FOREIGN PATENT DOCUMENTS

| | | |
|---|---|---|
| CN | 102385237 A | 3/2012 |
| CN | 103292697 A | 9/2013 |
| CN | 104854426 A | 8/2015 |
| DE | 10102943 A1 | 7/2002 |
| DE | 102015204473 A1 | 9/2016 |
| EP | 1464920 A1 | 10/2004 |
| FR | 2945619 A1 | 11/2010 |
| WO | 2008003546 A1 | 1/2008 |
| WO | 2012033578 A1 | 3/2012 |
| WO | 2014062302 A1 | 4/2014 |

OTHER PUBLICATIONS

Hall D L et al., "An Introduction to Multisensor Data Fusion", Proceedings of the IEEE, IEEE. New York, US, (Jan. 1, 1997), vol. 85, No. 1, doi:10.1109/5.554205, ISSN 0018-9219, pp. 6-23, XP011043797.

* cited by examiner

3D OBJECT SENSING SYSTEM

BACKGROUND OF THE INVENTION

Field of the Invention

The invention relates to a 3D object sensing system for providing a digital image of the 3D object to be detected.

From the state of the art it is basically known how to sense spatial objects especially according to their outer geometry.

According to the state of the art, this can be done by tactile methods, which have the advantage of a high accuracy of sensing points. However, it is disadvantageous that a high number of sensing points requires a very high expenditure of time. In addition, the generated point clouds are usually not sufficient to produce a realistic digital image of the spatial object to be captured.

Moreover, it is basically known from the state of the art how to sense spatial objects via photometric or acoustic methods in a non-tactile way. As a disadvantage, the usability of such methods considerably depends on the surface quality of the spatial object to be captured and can fail especially in case of inhomogeneous surfaces.

SUMMARY OF THE INVENTION

The task of the invention is to present a failure-insensitive and easy-to-operate solution for the complex sensing of a 3D object with as little personnel expenditure as possible.

The task is solved by the features listed in independent claim. Preferred further developments result from the sub-claims.

According to the invention, the 3D object sensing system comprises an object positioning unit, an object sensing unit and an evaluation unit as basic components.

The object positioning unit comprises a platform and a platform position detection unit.

The size and load capacity of the platform are such that a spatial object, hereinafter referred to as 3D object, can be placed on it. The platform is designed to rotate. The rotation axis of the platform corresponds to the vertical axis of the platform such that the platform is essentially horizontal and a placed 3D object can remain without any fixing. Thus, the platform preferably corresponds to the design of a rotary table. Hence, the vertical axis of the platform simultaneously corresponds to the vertical axis of the placed 3D object.

The 3D object itself is not part of the device of the invention. For the purposes of the present application, 3D objects are understood to be all spatial-physical objects. These can, for example, be parts with a previously known normative ii nominal condition from a production, which are to be sensed for documentation and verification purposes. Furthermore, these can also be objects of unknown nature that are to be digitally captured. In particular, these may also be components which are to be sensed for determining possible damage or for recognizing them for the purpose of spare part identification. Vehicles are also understood to be 3D objects in the sense of the present application.

The platform sensing unit is such that it can be used for sensing platform position data. The platform position data describe the describe the angular position of the rotating platform and thus indirectly the angular position of the placed 3D object. If the platform is rotated during a sensing process, object points of the 3D object, having different spatial coordinates at different angular positions, can be assigned to each other. The platform position data are provided to the evaluation unit in a transmittable manner.

For transmitting the platform position data, the object positioning unit and the evaluation unit are data-linked.

The object sensing unit comprises individual sensing systems. According to the invention, the object sensing unit comprises a number of at least two individual sensing systems from a group consisting of:
  3-D camera sensing system
  image camera sensing system
  infrared sensing system
  laser triangulation sensing system
  pattern projection sensing system
  deflectometry sensing system.

All individual sensing systems provide spatial coordinate data of object points of the 3D object. The spatial coordinate data of all individual sensing systems of the object sensing unit are related to one and the same spatial coordinate system. For this purpose, the individual sensing systems are calibrated for the same spatial coordinate system. In the following, this is also referred to as uniform ii spatial coordinate system.

The object sensing unit preferably has more than two of the listed individual sensing systems, preferably at least three of the individual sensing systems, especially preferably more than three of the individual sensing systems.

Depth camera systems, in particular in the form of TOF systems (Time of Flight), and stereo camera systems are used in particular as 3D camera sensing system. With the help of 3D camera sensing systems, spatial coordinates of object points can be captured as object data.

The image camera sensing systems are above all color camera systems such that brightness and color values of object points can be detected as object data. In this way, the external appearance of the 3D object in particular can be detected.

Infrared sensing systems are based on thermography and feature infrared cameras that receive the infrared radiation emitted by an object point as object data. The infrared sensing system can be passive, i.e. without prior exposure of the 3D object to infrared radiation, or active, i.e. with prior exposure of the 3D object to infrared radiation. By means of an infrared sensing system, material deviations below the surface of the 3D object can be detected, for example as a result of damage or repairs and especially overpainting of such areas.

A laser triangulation sensing system projects a laser dot onto the surface of the 3D object and has a camera being spaced from the laser source for optical detection of the laser dot, wherein the angle of the laser dot is evaluated trigonometrically and thus the distance of the object point corresponding to the laser dot can be determined. Thus, as a complement to a 3D camera sensing system, spatial coordinates of the object points of the 3D object can be sensed as object data.

A pattern light projection sensing system, also referred to as pattern projection, projects a light pattern onto the surface of the 3D object. Strip light projection is an important example. But dot patterns, for example, are also possible. A strip light projection sensing system projects a light strip on the object surface. The camera being spaced from the laser source captures the projected light strips. With the help of the angle and trigonometric evaluation, the spatial coordinate data of the points of the light strips are determined. As with laser triangulation, spatial coordinates of the object points of the 3D object can be detected as object data as a complement to a 3D camera sensing system.

Using a deflectometry sensing system, the reflections of known patterns are evaluated to determine the shape of an object surface. A deflectometry sensing system is suitable for reflective surfaces. Thanks to a deflectometry sensing system, spatial coordinate data of object points of possible high-gloss surfaces of the 3D object or polished surface sections can be detected as object data.

Each of the individual sensing systems has a sensing area. The sensing area covers at least sections of the 3D object. The sensing areas of the individual sensing systems overlap and form a common sensing area. The platform is positioned in such that a placed 3D object is at least partially within the common sensing area.

By means of the object positioning unit the 3D object is rotated. Sensing processes are carried out sequentially such that the platform and thus the 3D object are sensed at a variety of different angular positions.

The object sensing unit also has a positioning unit. The positioning unit establishes a fixed positional relationship between the different individual sensing systems as well as between the individual sensing systems and the object positioning unit. It is preferably a rack or frame. The positioning unit can also be formed as a housing.

Furthermore, markings are positioned in the common sensing area to enable calibration of the individual sensing systems into the same uniform spatial coordinate system. Preferably, the markings are placed at the inside of a housing.

The object sensing unit is further characterized in that object data of object points of the 3D object can be detected and provided in a manner transmittable to the evaluation unit by means of each of the at least two individual sensing systems. The object data contain, partly additionally, coordinate data of the object points. Depending on the individual sensing system, the coordinate data can be available as spatial coordinate data (x, y, z) or as two-dimensional coordinate data (x, y).

The evaluation unit comprises individual evaluation modules, an overall evaluation module and a generation module.

The evaluation unit receives the object data from the object sensing unit and the platform position data from the object positioning unit.

The evaluation unit has an individual evaluation module for each individual sensing system. The respective individual evaluation module performs an evaluation of the detection quality of the object data. It performs the evaluation of the object data, which are present at a defined coordinate point at a defined sensing angle. The coordinate point is defined by the coordinate data of the individual sensing system and the sensing angle by the platform position data. On the basis of the evaluation, a precategorization of these object data is performed with the help of an adjustable quality value. If the object data achieve the adjustable quality value, they are precategorized as usable object data. If the object data fall below the adjustable quality value, they are precategorized as non-usable object data. The adjustable quality value can be defined, for example, through permissible deviations from adjacent object points.

The object data from this sensing process relating to this specific object point are included into the overall evaluation from all sensing processes for this object point both in relation to all sensing angles and in relation to all dimensions. A dimension is always considered to be a type of object data and of information obtained in this way.

The evaluation by the individual evaluation module is thus carried out for each object point and for each individual sensing process performed for this object point.

The individual evaluation module is considered to be a functional category so that a sequential processing of the object data of different individual sensing systems by the same unit with subsequent intermediate storage is also considered to be an individual evaluation module per individual sensing system. The sensing processes of the different individual sensing systems and the subsequent evaluation of the object data by individual evaluation modules can—depending on the specific form—also be carried out in parallel.

The individual evaluation modules deliver the usable object data in a transmittable manner to the overall evaluation module.

By means of the overall evaluation module, the usable object data from the individual evaluation modules and thus from the individual sensing systems are assigned to each other on the basis of the coordinate data of the object points.

The overall evaluation module is designed such that the quality value of the usable object data of an individual sensing system can be compared to the quality value of the usable object data of another individual sensing system. On this basis, an object-point-related ranking categorization of the usable object data of the individual sensing systems as primary object data and as secondary object data is feasible depending on the quality value. The object data for a specific object point with the highest quality value are categorized as primary ii object data. The object data for this specific object point with the lowest quality value are categorized as secondary object data. An object point may have several secondary object data from different individual sensing systems, while primary object data for an object point may only exist once. The primary object data and the secondary object data are made available to the generation module in a transmittable manner.

The ranking categorization is thus based on an evaluation of the quality of the object data based on the quality value. The evaluation of the quality can be absolute or relative to the recorded data quality of the object data. Apart from discrete algorithms, algorithms including an "n-to-n" relation in the quality evaluation can also be used. Thus it is possible to increase the resulting quality of the object data even with a low quality of the object data from an individual sensing process by using the object data from several sensing angles and the object data from several different individual sensing systems each of them relating to the same object point.

If, according to a preferred variant, at least three individual sensing systems are available each providing object data, the overall evaluation module can perform a plausibility check in such a way that the object data from the at least three individual sensing systems detected for a specific object point are compared and that, as of an adjustable degree of deviation of the object data of a first individual sensing system from the object data of the further at least two individual sensing systems, the object data of the first individual sensing system are discarded and are no longer made available to the generation module in a transmittable manner.

The generation module is designed to assign the coordinate data from the object data of the individual sensing systems to a uniform spatial coordinate system, taking the platform position data into consideration. Different angular positions of the platform result in different coordinate data of the object data of one and the same object point of the 3D object. Nevertheless a clear assignment of all object data, which refer to one and the same object point, can be performed for this ii object point, since the evaluation unit knows the platform coordinate data in addition. On the basis of the primary object data, a basic digital image of the 3D object is first generated in the uniform spatial coordinate system. The primary object data thus have a key function.

The basic digital image generated in this way is initially only based on the coordinate data as well as on the further data which are part of the primary object data.

The basic digital image of the 3D object is now supplemented by the generation module by adding the secondary object data with the help of the coordinate data to form a digital image of the 3D object. The digital image is provided ready for output.

As a special advantage, the 3D object sensing system enables the generation of a uniform digital image of a 3D object on the basis of several individual sensing systems.

Thus, object data from different individual sensing systems are available for one and the same object point, which is also called multi-layer information. On the one hand, the individual sensing systems can advantageously support each other. This can in particular be the case for determining the spatial coordinate data by using, for example, the object data from a 3D camera sensing system for the opaque sections of the 3D object, such as a matt plastic surface and, for example, the object data from a deflectometry detection system for the reflecting sections of the 3D object, such as glass surfaces. Another advantage is that the 3D object sensing system automatically determines the quality and thus the suitability of the object data from different individual detection sensing systems and uses the object data resulting in a higher quality of the digital image.

Furthermore, the object data of the individual sensing systems can be in cumulative assignment to each other, for example by supplementing the object data from an individual image camera sensing system with the object data from an individual infrared system, and thus hidden structural inhomogeneities that have been covered by overcoating or overpainting can be made visible. For example, an object point can be shown as a surface-coated or overpainted representation and the surface under the surface-coating at the same object point can simultaneously be revealed to the viewer.

As a further advantage, the digital image enables to display the 3D object in different views and in different perspectives, for example as a 360° view. It is also possible that a 3D object that has movable sections is captured in different arrangements of these movable sections, for example a container as a closed or open container.

A particular advantage is that the result is a digital image of the 3D object that has a sufficient database, especially for the following two important applications.

Firstly, the digital image is suitable for recording deviations of a 3D object with a standardized nominal condition from a normative specification, e.g. by means of a CAD model, and from this automatically deriving necessary measures, such as a necessary replacement of a wear part or a necessary rejection of a component from a production with defects, whereby everything can be done in digital form.

Secondly, further processing of the digital image can automatically result in an evaluation of the 3D object. Such an evaluation can, for example, also be a commercial evaluation for enabling for instance remote purchase decisions for used goods located at a distance, whose direct inspection by an interested party would otherwise involve disproportionate effort.

The tamper-proof and reliable documentation of the captured condition of a 3D object is a particular advantage.

Another advantage is the modularity of the 3D object sensing system. Depending on requirements, i.e. depending on quality specifications or special detection targets, the 3D object sensing system can be equipped with different individual sensing units from the group mentioned above.

In total, the 3D object sensing system is based in particular on the fact that all sensors, in this case referred to as individual sensing systems, are calibrated for one and the same coordinate system. The number and type of sensors is variable and not limited thanks to the system principle. The sensors detect object data several times since data detection is performed from different angular positions due to the rotational movement of the 3D object on the platform. Furthermore, the detection is performed several times due to the different individual sensing systems. The resulting quality from the detected object data is increased, because even uncertain statements from a sensing process can be used by adding further uncertain statements from one or more further sensing processes.

In other words, the same point of the 3D object is sensed several times in one dimension, but also in several dimensions. In this sense, a dimension is understood to be a kind of information that results from a property of the 3D object, such as a geometrical property or, for example, the presence or absence of visually imperceptible damage.

All object data, i.e. any information, are summarized to form an object point and primary object data (as spatial coordinate data x, y, z as well as saved data on properties) are formed. The primary object data and the secondary object data related to the same object point are represented as several layers, that is the reason for why this can also referred to as multi-layer information. Each layer contains different types of information. Each type of information can also be referred to as a dimension, that is the reason for why this is also called multidimensional sensing, multidimensional information and/or multidimensional representation. Thanks to the multidimensionality, the viewer receives more information than through a purely spatial representation of the 3D object.

The result of the sensing process of the 3D object is provided as a digital image with several types of information such that the digital image is designed to represent a digital twin of the sensed 3D object.

Thanks to the digital image as a digital twin it is possible to view the sensed 3D object in a virtual reality format, i.e. in virtual reality.

This concerns the level of man-machine-communication.

Thanks to the digital image as a digital twin it is also possible to further process the information aggregated in this image automatically, for example for evaluating a wear part as further usable or for classifying it for exchange. Another example is the recognition of the identity of a detected component by means of an object recognition algorithm such that a correct spare part is selected, for example.

This concerns the level of machine-machine-communication.

According to an advantageous further development, the 3D object sensing system has a housing and the object positioning unit is located inside the housing. The housing results in the advantage that that defined light conditions or infrared radiation conditions can be achieved for the sensing processes and interference from light or heat sources are shielded in particular. This is advantageous for increasing the accuracy of the captured object data. At the same time, the environment and especially the personnel are protected from light, heat or laser sources of the individual sensing systems. Preferably, the housing can simultaneously form all or part of the positioning unit of the object sensing unit and define the positional relation of the individual sensing systems. Preferably, the object sensing unit is also located inside the housing.

In another advantageous further development, the 3D object sensing system additionally features an underfloor scanner, wherein the underfloor scanner is designed to detect object data of an object's bottom side and to transmit them to the evaluation unit and wherein the evaluation unit includes the object data for generating the digital image.

This is based on the fact that individual sensing systems are arranged such that their sensing area can easily detect the top, front, rear and both sides of the 3D object rotating on the platform, but the bottom side of the 3D object can only be detected to a limited extent.

The underfloor scanner can advantageously also sense the condition of the bottom side of the object. This is especially advantageous if functional components are installed on the bottom side.

According to another further development, the 3D object sensing system features an interior equipment scanner in addition. Object data of the interior space of the 3-D object are detected by means of the interior equipment scanner and made available to the evaluation unit for being included when generating the digital image. This can be particularly relevant for 3D objects that have a housing around an interior space, as is the case, for example, with a processing machine where the processing space forms the interior space, which is surrounded by a protective enclosure. The interior equipment scanner is able to function according to each sensing process as explained for the individual sensing systems of the object sensing unit, such as 3D camera sensing system, image camera sensing system or infrared sensing system. The interior equipment scanner can especially involve several parts and simultaneously apply several of these sensing methods. The object points, for which object data are detected by the interior equipment scanner, are integrated into the uniform spatial coordinate system by the evaluation unit.

According to another further development, the 3D object sensing system ii features a comparison module. The comparison module is equipped with a database including data on a normative digital image. The database can be an internal or external database. An external database enables centralized data maintenance as an additional advantage. The normative digital image is preferably available as a CAD model and defines a nominal condition, e.g. a workpiece during production or a wear part that is captured to check its condition.

The comparison module is designed to perform a comparison between the digital image and the normative image and to generate a digital difference image. The digital difference image describes the extent to which the state of the 3D object, which has been recorded, differs from the normative condition. The digital difference image thus shows possible manufacturing defects, wear or damage in particular. Thus, a damage report, for example, can be output as error or damage report. This status information can also be a basis for statements on necessary measures such as replacement or repair or on the commercial value of the 3D object.

The invention is explained in detail as a design example on the basis of the drawings.

BRIEF DESCRIPTION OF THE SEVERAL VIEWS OF THE DRAWING

FIG. 1 shows a first design example of a 3D object sensing system according to the invention.

DETAILED DESCRIPTION OF THE INVENTION

Figure 1:
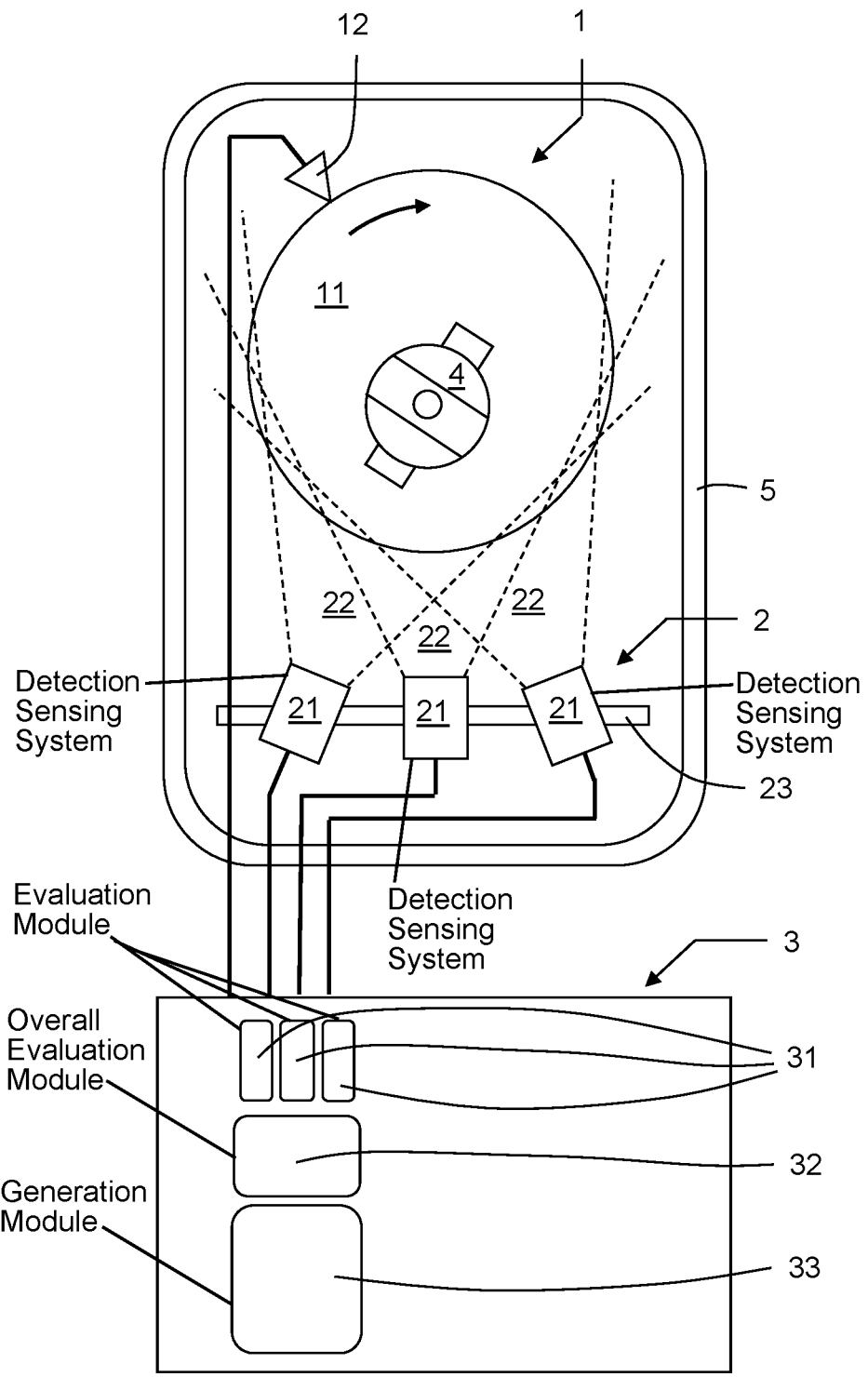
FIG. 1 shows a top view in schematic presentation.

The object positioning unit 1 has a rotatable platform 11 onto which a 3D object 4 can be positioned. In the design example, the 3D object is a machine assembly. The rotation capability of the platform 11 is illustrated by the arrow. The rotational position and thus the angular position of the platform 11 is detected by the platform position sensing unit 12 and transmitted to the evaluation unit 3.

In the design example, the object sensing unit 2 has three individual detection sensing systems 21, each with a sensing area 22. The sensing area 22 is oriented such that the 3D object 4 located on the platform 11 is covered. The design example shows that the sensing areas 22 overlap. The individual sensing systems 21 are rigidly mounted on a positioning unit 23, which is designed as a rack. Rigid mounting ensures that after calibration, all object data detected by the individual sensing systems on the object points of the 3D object can be assigned to a uniform spatial coordinate system. The single sensing systems 21 in the design example are a 3D camera sensing unit, an image camera sensing unit and an infrared sensing unit.

In a particularly advantageous design example, modified compared to the design example shown in FIG. 1, the object sensing unit has five individual sensing units, namely a 3D camera sensing unit, an image camera sensing unit, an infrared sensing unit, a deflectometry sensing unit and a pattern light projection sensing unit.

In the design example shown in FIG. 1, both the object positioning unit 1 and the object sensing unit 2 are located within a housing 5. This has an opening that can be closed (not shown in FIG. 1) through which the 3D object 4 can be moved into the interior on the platform 11 and removed again after sensing. In the design example, the object detection unit 2 also has means for lighting 3D object 4 with defined luminous intensity and defined color temperature to increase the precision of the object data. The means for lighting are not shown in FIG. 1.

Furthermore, the design example according to FIG. 1 has an evaluation unit 3. In the design example, the evaluation unit 3 is a computer system.

Each of the three individual evaluation modules 31 of evaluation unit 3 receives the object data from the respectively assigned individual sensing system 21 of the three individual sensing systems 21 via data lines. All data lines from the single sensing systems 21 and from the platform position sensing unit 12 to the ii evaluation unit 3 are shown without reference signs. The individual evaluation modules 21 perform an evaluation of the quality of the object data. A quality value of the detection quality is preset for this purpose. If the object data reach or exceed the set quality value, the object data are precategorized as usable object data and transferred to the overall evaluation module 32. If the object data do not achieve the set quality value, the object data are precategorized as non-usable object data and are not forwarded. This ensures that only sufficiently reliable object data are included in the digital image to be formed later such that the digital image also has a high degree of reliability.

In the overall evaluation module 32, the usable object data are assigned to each other based on the coordinate data of the object points. This assignment is based on the fact that the evaluation unit 3 can assign all individual sensing systems 21 to a uniform spatial coordinate system by means of the defined position of the individual sensing systems 21 through the positioning unit 23 and the angular position of the platform 11 known with the help of the platform position sensing unit 12 and thus of the placed 3D object 4. After successful assignment, the overall evaluation module 32 compares the quality value of the usable object data of each of the individual detection systems 21 with those of the other individual detection systems 21. In the comparison result, the compared usable object data are categorized according to their rank. The object data with the highest quality value receive the highest ranking. The object data with the highest ranking are categorized as primary object data. The object data with the lowest ranking are categorized as secondary object data.

The primary and secondary object data are transferred to generation module 33. The generation module assigns the coordinate data from the object data of the individual detection systems 21 to a uniform spatial coordinate system, taking the platform position data into consideration. On the basis of the primary object data, a basic digital image of the 3D object 4 is first generated in the uniform spatial coordinate system. The basic digital image of the 3D object 4 is now supplemented by adding the secondary object data with the help of the coordinate data to form a digital image of the 3D object 4. This digital image is provided ready for output. In the design example, the digital image is transferred as a file.

Figure 2:
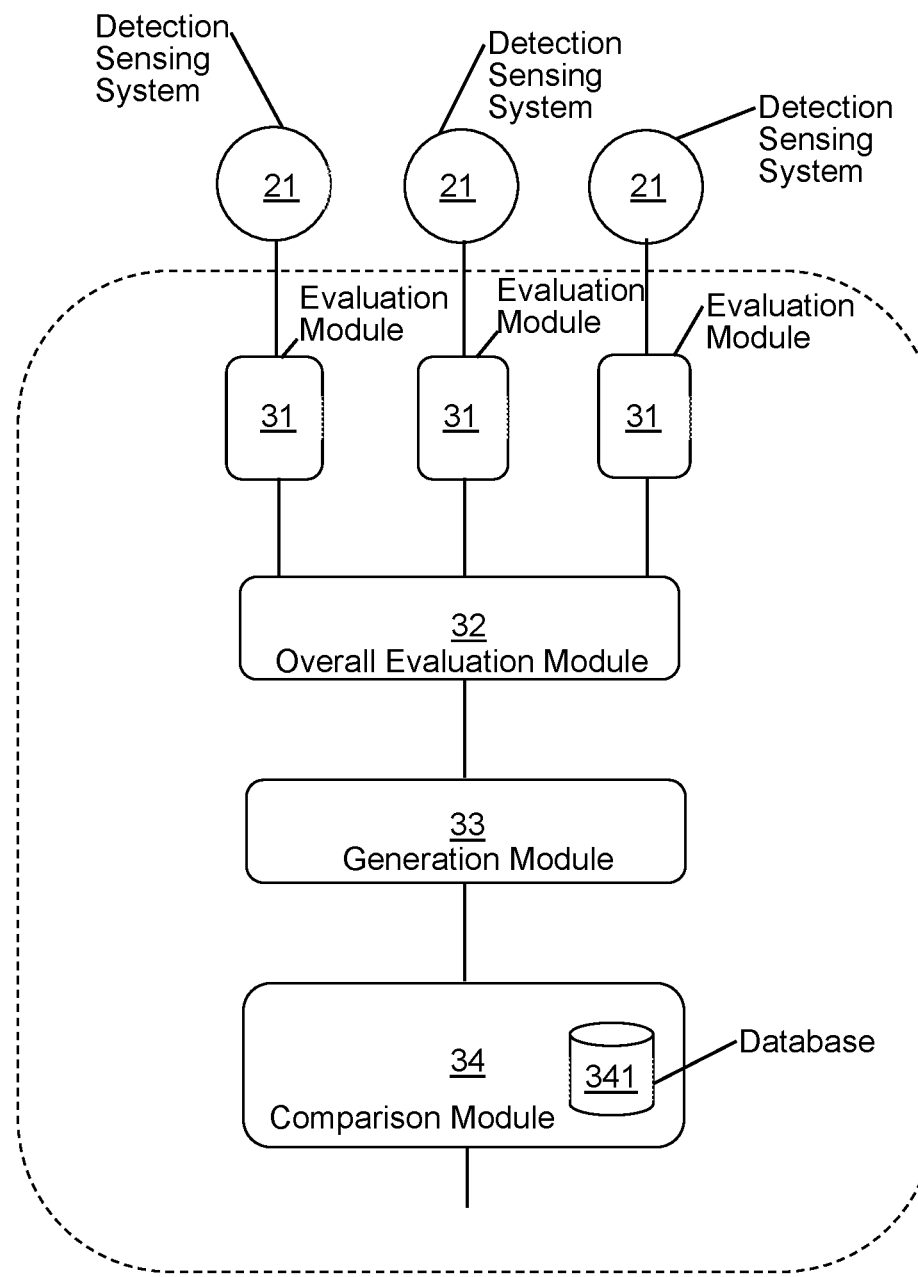
FIG. 2 shows a block diagram with repair calculation module and value assessment module.

FIG. 2 shows another design example represented as block diagram.

For the detection sensing units 21, the individual evaluation modules 31, the overall evaluation module 32 and the generation module 33, the explanations relating to the design example according to FIG. 1 apply accordingly.

After the digital image has been generated by the generation module 33, it is transferred to a comparison module 34 in the design example shown in FIG. 2. The comparison module 34 contains a database 341 as a database with data on normative digital images, whereby the normative image of the captured 3D object 4, present in the machine assembly, is also included. The comparison module 34 recognizes the type of the detected 3D object 4, i.e. the type of machine assembly, on the basis of the digital image and performs a comparison between the digital image of the detected 3D object 4, which has been transmitted by the generation module 33, and the normative image of the corresponding type, which has been taken from database 341, and thus generates a digital difference image. The digital difference image contains information on deviations of the detected machine assembly 4 from an originally manufactured machine assembly such that damages in particular can be identified.

REFERENCE SIGNS USED

1 Object positioning unit
11 Platform
12 Platform position sensing unit
2 Object sensing unit
21 Individual sensing system
22 Sensing area
23 Positioning unit
3 Evaluation unit
31 Individual evaluation module
32 Overall evaluation module
33 Generation module
34 Comparison module
341 Database of the comparison module
4 3-D object
5 Housing

The invention claimed is:
1. A 3D object sensing system comprising:
an object positioning unit;
an object sensing unit;
and an evaluation unit;
said object positioning unit having a platform and a platform position sensing unit, said platform being constructed for placing a 3D object thereon, said platform being rotatable about an axis thereof, and said platform position sensing unit being configured for detecting platform position data and providing the platform position data in a manner transmittable to said evaluation unit;
said object sensing unit including two individual sensing systems from a group consisting of:
a 3D camera sensing system;
an image camera sensing system;
an infrared sensing system;
a laser triangulation sensing system;
a pattern light projection sensing system; or
a deflectometry sensing system;
each individual sensing system having a sensing area, the sensing area covering sections of the platform and covering an area for the 3D object;
a positioning unit defining a positional relation of said two individual sensing systems to one another and to said object positioning unit, said two individual sensing systems for sensing object data of object points of the 3D object and providing the object data in a transmittable manner to said evaluation unit, the object data containing coordinate data of the object points;
said evaluation unit including respective evaluation modules for each of the two individual sensing systems, an overall evaluation module and a generation module;
each of said respective evaluation modules being configured for performing an evaluation of a sensing quality of the object data and, on the basis of the evaluation, assigning an evaluated quality value and performing a pre-categorization as usable object data when an adjustable quality value level of the sensing quality is achieved by the evaluated quality value or as non-usable object data when the evaluated quality value falls below the adjustable quality value level, and each of said respective evaluation modules being configured for providing the usable object data to said overall evaluation module in a transmittable manner, wherein the usable object data is assigned to one another by using the coordinate data for the object points, wherein a comparison of the evaluated quality value of the usable object data of an individual sensing system of said two individual sensing systems with a further evaluated quality value of the usable object data of a further individual sensing system of said two individual sensing systems is performed, wherein, on the basis of the comparison, a ranking categorization of the usable object data of said two individual sensing systems is performed as primary object data and as secondary object data; and said generation module being configured for assigning the coordinate data from the object data of said two individual sensing systems, also integrating the platform position data, to a uniform spatial coordinate system, generating a basic digital image of the 3D object on the basis of the primary object data, generating a digital image by supplementing the basic digital image of the 3D object by adding the secondary object data on the basis of the coordinate data and providing the digital image in a manner capable of being output.

2. The 3D object sensing system according to claim 1, further comprising a housing, said object positioning unit being located inside said housing.

3. The 3D object sensing system according to claim 1, further comprising an underfloor scanner for sensing object data of a bottom side of the 3D object and making the object data of the bottom side available to said evaluation unit for inclusion when generating the digital image.

4. The 3D object sensing system according to claim 1, further comprising an interior equipment scanner for sensing object data of an interior space of the 3D object and making the object data of the interior space available to said evaluation unit for inclusion when generating the digital image.

5. The 3D object sensing system according to claim 1, further comprising a comparison module including a database with data relating to a normative digital image, said comparison module being configured for performing a comparison between the basic digital image and the normative digital image and generating a digital difference image.

* * * * *